(12) United States Patent
Uchiyama (10) Patent No.: US 10,562,217 B2
(45) Date of Patent: Feb. 18, 2020

(54) ABRASION AMOUNT ESTIMATION DEVICE AND ABRASION AMOUNT ESTIMATION METHOD FOR CHECK VALVE OF INJECTION MOLDING MACHINE

(71) Applicant: FANUC CORPORATION, Yamanashi (JP)

(72) Inventor: Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 474 days.

(21) Appl. No.: 15/581,537

(22) Filed: Apr. 28, 2017

(65) Prior Publication Data
US 2017/0326771 A1    Nov. 16, 2017

(30) Foreign Application Priority Data
May 12, 2016    (JP) ................................ 2016-095986

(51) Int. Cl.
*B29C 45/76*    (2006.01)
*B29C 45/23*    (2006.01)
(Continued)

(52) U.S. Cl.
CPC .............. *B29C 45/76* (2013.01); *B29C 45/23* (2013.01); *B29C 45/234* (2013.01);
(Continued)

(58) Field of Classification Search
CPC .................. B29C 45/76; B29C 45/768; B29C 45/23–234
See application file for complete search history.

(56) References Cited

U.S. PATENT DOCUMENTS 5,153,149 A    10/1992    Naito et al.
5,778,279 A    7/1998    Kawai et al.
(Continued)

FOREIGN PATENT DOCUMENTS

JP    H01168421 A    7/1989
JP    H01281912 A    11/1989
(Continued)

OTHER PUBLICATIONS

Ma, Jun et al.; Fault Diagnosis Method of Check Valve Based on Multikernel Cost-Sensitive Extreme Learning Machine; 2017; WILEY; Hindawi Complexity vol. 2017, Article ID 8395252; pp. 1-19. (Year: 2017).*

(Continued)

*Primary Examiner* — Stanley K. Hill
(74) *Attorney, Agent, or Firm* — Hauptman Ham, LLP (57) ABSTRACT

An abrasion amount estimation device stores a learning result obtained through supervised learning performed based on a feature amount, which is extracted from a physical amount which is acquired in injection performed by an injection molding machine, and information related to an abrasion amount of a check valve which has been attached to the injection molding machine in the injection. The abrasion amount estimation device estimates an abrasion amount of a check valve which has been attached to the injection molding machine in the injection based on the learning result which is stored and the feature amount which is extracted.

7 Claims, 5 Drawing Sheets

(51) Int. Cl.
  *G06N 3/04* (2006.01)
  *G06N 3/08* (2006.01)
(52) U.S. Cl.
  CPC .............. *B29C 45/768* (2013.01); *G06N 3/04* (2013.01); *G06N 3/088* (2013.01)

(56) References Cited

U.S. PATENT DOCUMENTS

| | | | | |
|---|---|---|---|---|
| 7,074,028 | B2* | 7/2006 | Watanabe | B29C 45/50 |
| | | | | 264/40.3 |
| 7,661,946 | B2* | 2/2010 | Maruyama | B29C 45/50 |
| | | | | 425/145 |
| 7,722,349 | B2* | 5/2010 | Oomori | B29C 45/76 |
| | | | | 425/145 |
| 9,090,015 | B2* | 7/2015 | Oono | B29C 45/77 |
| 10,295,986 | B2* | 5/2019 | Saitou | G06N 3/084 |
| 2002/0026264 | A1 | 2/2002 | Choi | |
| 2004/0086024 | A1 | 5/2004 | Choi | |
| 2008/0305201 | A1 | 12/2008 | Maruyama et al. | |
| 2008/0305202 | A1 | 12/2008 | Oomori et al. | |
| 2010/0202581 | A1 | 8/2010 | Kitajima et al. | |
| 2013/0245807 | A1 | 9/2013 | Herbst | |
| 2015/0293523 | A1 | 10/2015 | Yamamoto et al. | |
| 2016/0250791 | A1 | 9/2016 | Schiffers et al. | |

FOREIGN PATENT DOCUMENTS

| | | |
|---|---|---|
| JP | H9-179458 A | 7/1997 |
| JP | H11-10535 A | 1/1999 |
| JP | 2004-156616 A | 6/2004 |
| JP | 2006-308515 A | 11/2006 |
| JP | 2007-112100 A | 5/2007 |
| JP | 2008302527 A | 12/2008 |
| JP | 2008302528 A | 12/2008 |
| JP | 2009-79906 A | 4/2009 |
| JP | 2009096045 A | 5/2009 |
| JP | 2009-196372 A | 9/2009 |
| JP | 2013-535064 A | 9/2013 |
| JP | 2015-203646 A | 11/2015 |
| WO | 2015/052072 A1 | 4/2015 |

OTHER PUBLICATIONS

Office Action in Japanese Application No. 2016-095986, dated May 29, 2018, 8 pp.

* cited by examiner

FIG.1A  LEARNING STAGE

TEACHER DATA

| $x_1$ | $x_2$ | $x_3$ | ... | y |
|---|---|---|---|---|
| 1.0 | 11.5 | 100.0 | ... | 0 |
| 2.2 | 20.4 | 99.2 | ... | 0 |
| 11.0 | 24.8 | 120.8 | ... | 1 |
| 5.2 | 31.2 | 168.4 | ... | 1 |
| ⋮ | ⋮ | ⋮ | ⋮ | ⋮ |

PROCEED LEARNING BASED ON TEACHER DATA

MACHINE LEARNING DEVICE

FIG.1B  ESTIMATION STAGE BASED ON LEARNING RESULT

INPUT DATA

| $x_1$ | $x_2$ | $x_3$ | ... |
|---|---|---|---|
| 8.3 | 54.2 | 154.1 | ... |

ESTIMATE OUTPUT DATA FROM INPUT DATA BASED ON LEARNING RESULT

MACHINE LEARNING DEVICE

OUTPUT DATA

| y |
|---|
| 1 |

FIG.5

ABRASION AMOUNT ESTIMATION DEVICE AND ABRASION AMOUNT ESTIMATION METHOD FOR CHECK VALVE OF INJECTION MOLDING MACHINE

RELATED APPLICATIONS

The present application claims priority to Japanese Application Number 2016-095986 filed May 12, 2016, the disclosure of which is hereby incorporated by reference herein in its entirety.

BACKGROUND OF THE INVENTION

1. Field of the Invention

The present invention relates to an abrasion amount estimation device and an abrasion amount estimation method for check valve of an injection molding machine, and especially relates to an abrasion amount estimation device and an abrasion amount estimation method for check valve of an in-line type injection molding machine.

2. Description of the Related Art

In an in-line type injection molding machine, a check valve provided on an end of a screw makes relatively-advancing and relatively-retreating movement during injection and metering so as to prevent resin from flowing in a rear direction of the screw during injection and allow the resin to flow from the rear direction to the forward direction during metering. Here, if the check valve does not retreat during injection or timing of movement of the check valve is not stable even when the check valve retreats, a problem occurs in which mass of a molded article does not reach a predetermined value due to a backflow phenomenon of resin toward the screw backward direction or variation in mass of molded articles is generated.

Such problem in movement of a check valve is attributed mainly to change of a dimension of the check valve from the initial dimension caused by abrasion thereof resulted from prolonged molding. Accordingly, in order to stably produce high-quality injection molded articles in a long period, it is necessary to monitor whether or not a check valve is abraded, and to promptly exchange the check valve for a new check valve when abrasion is detected.

As a method for detecting an abrasion amount of a check valve, a method in which a screw is regularly taken out from an injection cylinder so as to directly measure the dimension is known. However, in this method, the measurement operation has to be performed in a state where production is temporarily suspended, thereby degrading productivity disadvantageously. Therefore, as a method for indirectly detecting an abrasion amount without taking out a screw from an injection cylinder, a method for detecting the backflow phenomenon of resin toward the screw backward is known. For example, Japanese Patent Application Laid-Open No. 01-168421 and Japanese Patent Application Laid-Open No. 2008-302527 disclose a method in which a load torque which is applied in a rotation direction of a screw is measured so as to detect the backflow phenomenon of resin. Further, Japanese Patent Application Laid-Open No. 01-281912 and Japanese Patent Application Laid-Open No. 2009-096045 disclose a method in which an advancing speed of a screw during packing process is measured so as to detect the backflow phenomenon of resin. Furthermore, Japanese Patent Application Laid-Open No. 2008-302528 discloses a method for estimating an abrasion amount of a check valve based on a screw position detected when the check valve is closed.

The methods for detecting abrasion of a check valve disclosed in the above-mentioned prior art techniques have a merit that abrasion of a screw can be indirectly detected even during production through detection of the backflow phenomenon of resin. However, operation conditions of an injection molding machine during production vary depending on molded articles or kinds of resin, and a load torque and an advancing speed of a screw which are indices of the above-mentioned backflow phenomenon also vary depending on operation conditions of the injection molding machine. Thus, it is hard to estimate an abrasion amount of a check valve with high accuracy.

SUMMARY OF THE INVENTION

An object of the present invention is to provide an abrasion amount estimation device and an abrasion amount estimation method for highly accurately estimating an abrasion amount of a check valve without depending on operation conditions of an injection molding machine.

In the present invention, the above-mentioned problems are solved by providing a function for highly accurately estimating an abrasion amount of a check valve by utilizing machine learning without depending on operation conditions of an injection molding machine.

An abrasion amount estimation device, according to the present invention, which estimates an abrasion amount of a check valve attached to an injection molding machine includes: a learning result storage unit which stores a learning result obtained through supervised learning performed based on a feature amount, which is extracted from a physical amount which is acquired in injection performed by the injection molding machine, and information related to an abrasion amount of a check valve which has been attached to the injection molding machine in the injection; a physical amount acquisition unit which acquires a physical amount in injection of the injection molding machine; a feature amount extraction unit which extracts a feature amount of a physical amount based on the physical amount acquired by the physical amount acquisition unit; an abrasion amount estimation unit which estimates an abrasion amount of a check valve which has been attached to the injection molding machine in the injection, based on the learning result stored in the learning result storage unit and the feature amount extracted by the feature amount extraction unit; and an estimation result output unit which outputs an abrasion amount estimated by the abrasion amount estimation unit.

The abrasion amount estimation device may further include a supervised learning unit which performs supervised learning based on a feature amount, which is extracted from a physical amount which is acquired in injection performed by the injection molding machine, and information related to an abrasion amount of a check valve which has been attached to the injection molding machine in the injection and stores a result of the learning in the learning result storage unit.

A feature amount of the physical amount may be a numerical value representing a feature of the physical amount.

A feature amount of the physical amount may be a feature amount obtained by approximating a variation pattern of the physical amount.

An abrasion amount estimation method, according to the present invention, for estimating an abrasion amount of a check valve of an injection molding machine includes: performing an injection operation in a state in which a plurality of check valves having abrasion amounts different from each other are attached respectively; acquiring a physical amount related to an injection operation during the injection operation performed by the injection molding machine; extracting a feature amount of the physical amount which is acquired; performing supervised learning in which an abrasion amount of the check valve is used as correct answer information and the feature amount which is extracted is used as an input; and estimating an abrasion amount of a check valve based on a learning result of the supervised learning when an arbitrary feature amount of the physical amount is inputted.

A feature amount of the physical amount may be a numerical value representing a feature of the physical amount.

A feature amount of the physical amount may be a feature amount obtained by approximating a variation pattern of the physical amount.

According to the present invention, an abrasion amount of a check valve can be highly accurately estimated without any influence of operation conditions of an injection molding machine.

DETAILED DESCRIPTION OF THE PREFERRED EMBODIMENT

In the present invention, an abrasion amount of a check valve is highly accurately estimated by using machine learning without depending on operation conditions of an injection molding machine. In the machine learning according to the present invention, feature extraction is performed based on physical amounts in injection molding machines respectively using check valves having different abrasion amounts (different dimensions) from each other so as to perform machine learning of feature amounts extracted through this feature extraction and abrasion amounts of the check valves (dimensions of the check valves changed through abrasion).

More specifically, in the machine learning according to the present invention, check valves having different abrasion amounts (check valves having different dimensions) from each other are prepared in advance and these check valves are respectively attached to injection molding machines so as to perform a molding operation. Then, a plurality of kinds of molding conditions are set in the molding operation and injection is performed to acquire and store waveform data in which a physical amount during the injection is associated with elapsed time from the start of the injection or a screw position during the injection. Further, feature extraction is performed based on the waveform data of the physical amount. Then, machine learning in which the extracted feature amount is used as an input and a dimension of the check valve is used as an output is performed.

The machine learning used in the present invention will be briefly described below.

<1. Machine Learning>

Machine learning is implemented in a manner such that useful rules, knowledge representation, criterion for determination, and the like included in a set of data inputted into a device performing machine learning (hereinafter referred to as machine learning device) are extracted through analysis and the determination results are outputted to perform learning of the knowledges. There are various methods for machine learning, but these methods are briefly categorized into "supervised learning", "unsupervised learning", and "reinforcement learning". Further, in implementation of these methods, there is a method called "deep learning" in which extraction of a feature amount itself is learned.

"Supervised learning" is a method in which a machine learning device is supplied with a large number of data pairs of inputs and results (labels) so as to learn the features included in these data sets and recursively acquire a model for estimating the results from the inputs, that is, a relationship between the inputs and the results. The supervised learning can be implemented by using an algorithm such as a neural network which will be described later.

"Unsupervised learning" is a method in which a learning device is supplied with only a large quantity of input data so as to learn distribution of the input data and learn a device for performing compression, classification, shaping, and the like with respect to input data without reception of corresponding teacher output data. Similar features included in the data sets can be clustered, for example. It is possible to implement an estimation of outputs by providing certain criterion and allocating the outputs so as to optimize these criterion.

Further, there is also "semi-supervised learning" as an intermediate problem setting between "supervised learning" and "unsupervised learning". In the case of "Semi-supervised learning", only a part of data set is data pairs of inputs and outputs and the rest of data set is data of only inputs. In a present embodiment, data which can be acquired without actually operating a machining device is used in unsupervised learning and thus, learning can be efficiently implemented.

"Reinforcement learning" is a method for learning an appropriate action based on an interaction between an action and an environment by learning not only determination and classification but also actions, that is, learning for maximizing a reward which will be obtained in the future. In the reinforcement learning, a machine learning device can start learning in a state where the machine learning device does not know a result caused by an action at all or a state where the machine learning device knows a result deficiently. Further, the machine learning device can start learning from a desired start point in an initial state where prior learning (a method such as reverse reinforcement learning and the above-mentioned supervised learning) has been performed so as to simulate human actions.

The present invention is aimed at learning a correlation between a feature amount which is extracted from a physical amount acquired in an operation of an injection molding machine and an abrasion amount of a check valve which is attached to the injection molding machine (a dimension of the check valve which has changed through abrasion). An algorithm of the supervised learning is employed while considering that learning can be performed based on clearly indicated data and that an abrasion amount of a check valve needs to be determined based on a learning result.

Figure 1A:
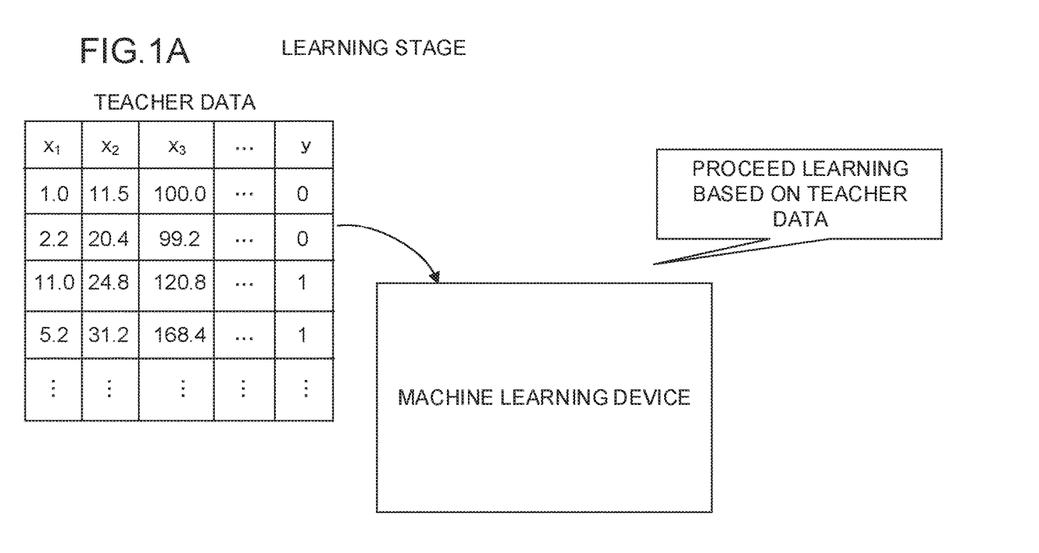
FIG. 1A and FIG. 1B schematically illustrate an operation of a machine learning device which performs supervised learning.
Figure 1B:
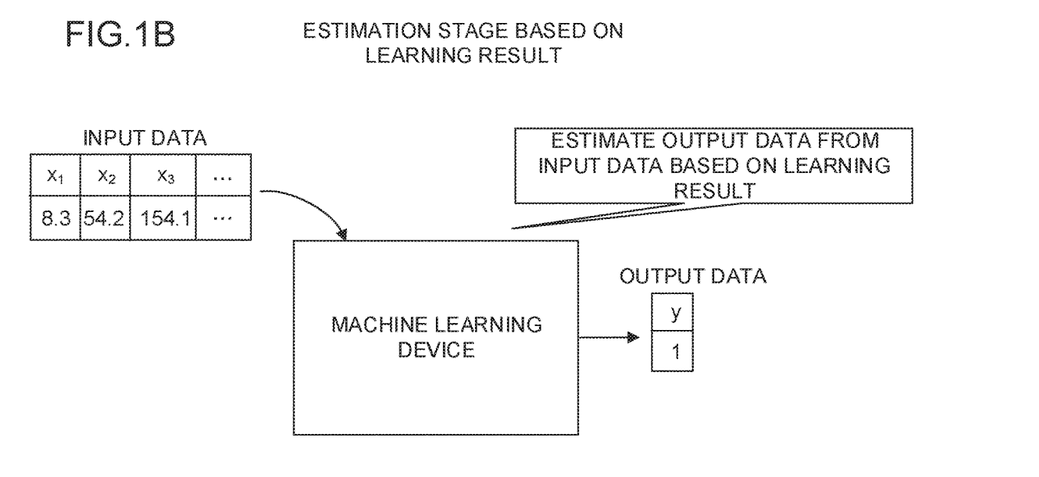

FIG. 1A and FIG. 1B schematically illustrate an operation of a machine learning device which performs supervised learning.

An operation of a machine learning device which performs supervised learning can be broadly separated into two stages which are a learning stage and an estimation stage. When teacher data which includes a value of a state variable used as input data (explanatory variables: $x_1, x_2, x_3, \ldots$ in FIG. 1A) and a value of an objective variable used as output data (y in FIG. 1A) is provided in the learning stage (FIG. 1A), a machine learning device which performs supervised learning learns to output the value of the objective variable when the value of the state variable is inputted. By providing a lot of such teacher data, the machine learning device constructs an estimation model for outputting a value of an objective variable corresponding to a value of a state variable (a function f for performing mapping).

Further, when new input data (state variable) is provided in the estimation stage (FIG. 1B), the machine learning device which performs supervised learning estimates output data (objective variable) in accordance with a learning result (the constructed estimation model) and outputs the output data.

As an example of learning of a machine learning device which performs supervised learning, there is a method in which a regression formula such as the following formula (1) is used as an estimation model (the function f for performing mapping). In the method using a regression formula, learning is proceeded by adjusting a value of each of coefficients $a_0, a_1, a_2, a_3, \ldots$ so that a value of an objective variable (correct answer information) y can be obtained when a value of each of the state variables $x_1, x_2, x_3, \ldots$ in the formula (1) is applied to the regression formula in a process of learning.

$$y = a_0 + a_1 x_1 + a_2 x_2 + a_3 x_3 + \ldots + a_n x_n \quad (1)$$

Figure 2:
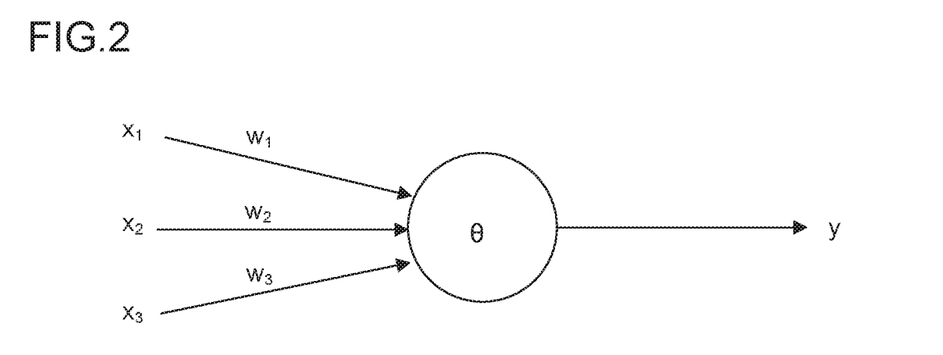
FIG. 2 is a schematic diagram illustrating a model of a neuron.

Further, as another example of learning by a machine learning device which performs supervised learning, there is a method in which a neural network, for example, is used as an estimation model (the function f for performing mapping). The neural network is constituted of an arithmetic device, a memory, and the like which implement a neural network that simulates a model of a neuron as illustrated in FIG. 2, for example. FIG. 2 is a schematic diagram illustrating a model of a neuron.

As illustrated in FIG. 2, a neuron outputs correct answer information y corresponding to an input x (here, a plurality of inputs $x_1$ to $x_3$ as an example). Each of the inputs $x_1$ to $x_3$ is multiplied by a weight w ($w_1$ to $w_3$) corresponding to the input x. Accordingly, the neuron outputs the correct answer information y expressed by the following formula (2). Here, in the formula (2), the input x, the correct answer information y, and the weight w are all vectors. Further, $\theta$ denotes a bias and $f_k$ denotes an activation function.

$$y = f_k(\Sigma_{i=1}^n x_i w_i - \theta) \quad (2)$$

Further, as an application of the method in which a neural network is used for learning of a machine learning device which performs supervised learning, there is a method in which a neural network having three layer weights obtained by combining above-mentioned neurons is used as an estimation model (the function f for performing mapping).

Figure 3:
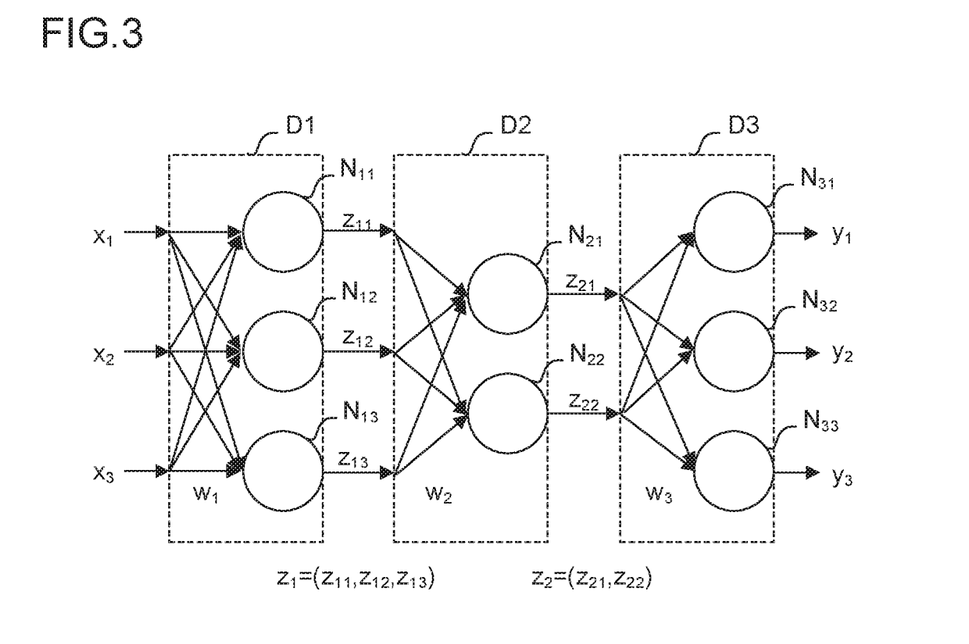
FIG. 3 is a schematic diagram illustrating a neural network having three layer weights.

FIG. 3 is a schematic diagram illustrating a neural network having the three layer weights of D1 to D3.

In the example illustrated in FIG. 3, the input x (here, a plurality of inputs $x_1$ to $x_3$ as an example) is inputted from the left side of the neural network and the correct answer information y (here, a plurality of pieces of correct answer information $y_1$ to $y_3$ as an example) is outputted from the right side.

Specifically, the inputs $x_1$ to $x_3$ are inputted into each of three neurons $N_{11}$ to $N_{13}$ in a manner to be multiplied by corresponding weights. In FIG. 3, the weights multiplied with respect to these inputs (weights multiplied with respect to the inputs $x_1$ to $x_3$ which are inputted into each of the neurons) are collectively denoted as a matrix $w_1$. The neurons $N_{11}$ to $N_{13}$ output $z_{11}$ to $z_{13}$ respectively. These $z_{11}$ to $z_{13}$ are collectively denoted as a feature vector $z_1$ and can be considered as vectors obtained by extracting feature amounts of the input vectors. This feature vector $z_1$ is a feature vector between the weight $w_1$ and the weight $w_2$.

The feature vectors $z_{11}$ to $z_{13}$ are inputted into each of two neurons $N_{21}$ and $N_{22}$ in a manner to be multiplied by corresponding weights. In FIG. 3, the weights multiplied with respect to these feature vectors (weights which are multiplied with respect to elements of the feature vectors which are inputted into each of the neurons) are collectively denoted as a matrix $w_2$. The neurons $N_{21}$ and $N_{22}$ output $z_{21}$ and $z_{22}$ respectively. These $z_{21}$ and $z_{22}$ are collectively denoted as a feature vector $z_2$. This feature vector $z_2$ is a feature vector between the weight $w_2$ and the weight $w_3$.

The feature vectors $z_{21}$ and $z_{22}$ are inputted into each of three neurons $N_{31}$ to $N_{33}$ in a manner to be multiplied by corresponding weights. In FIG. 3, the weights multiplied with respect to these feature vectors (weights which are multiplied with respect to elements of the feature vectors which are inputted into each of the neurons) are collectively denoted as a matrix $w_3$.

Finally, the neurons $N_{31}$ to $N_{33}$ output correct answer information $y_1$ to $y_3$ respectively.

The operation of the neural network illustrated in FIG. 2 and FIG. 3 includes a learning mode (corresponding to the learning stage of FIG. 1) and an estimation mode (corresponding to the estimation stage of FIG. 1). Each weight w is learned by using a learning data set in the learning mode and action determination of an injection molding machine is performed in the estimation mode by using the parameter (note that "estimation" here includes various tasks such as detection, classification, and inference).

Here, it is possible to learn instantaneously data that has been obtained by actually operating the injection molding machine in the estimation mode and reflect the learning result to the next action (online learning), and it is also possible to collectively perform a learning by using a group of data that has been collected in advance and perform a detection mode using the parameters thereafter (batch learning). As an intermediate method between the online learning and the batch learning, it is possible to interpose a learning mode every time a certain amount of data are accumulated.

The weights $w_1$ to $w_3$ can be learned by the error back propagation method (back propagation). Information of an error enters from the right side and flows toward the left side. The error back propagation method is a method for adjusting (learning) each weight so as to reduce a difference between correct answer information y which is outputted when an input x is inputted and real correct answer information y (teacher) for every neuron.

The number of layers in the neural network may be increased to three or more (called deep learning). An arithmetic device which performs feature extraction of inputs in stages and recurs results can be automatically obtained only based on teacher data.

Here, as an algorithm of supervised learning, various methods such as the least squares method, the stepwise method, the SVM, and the decision tree learning are also well-known. Any supervised learning algorithm may be employed as a method applied to the present invention. Since each of these other supervised learning algorithms and each of the above-mentioned supervised learning algorithms such as the method using a regression formula and the method using a neural network are well-known, detailed description of each algorithm will be omitted in this specification.

The abrasion amount estimation method for check valve of an injection molding machine according to the present invention in which the above-mentioned supervised learning is used will be specifically described below.

<2. Embodiment>

Figure 4:
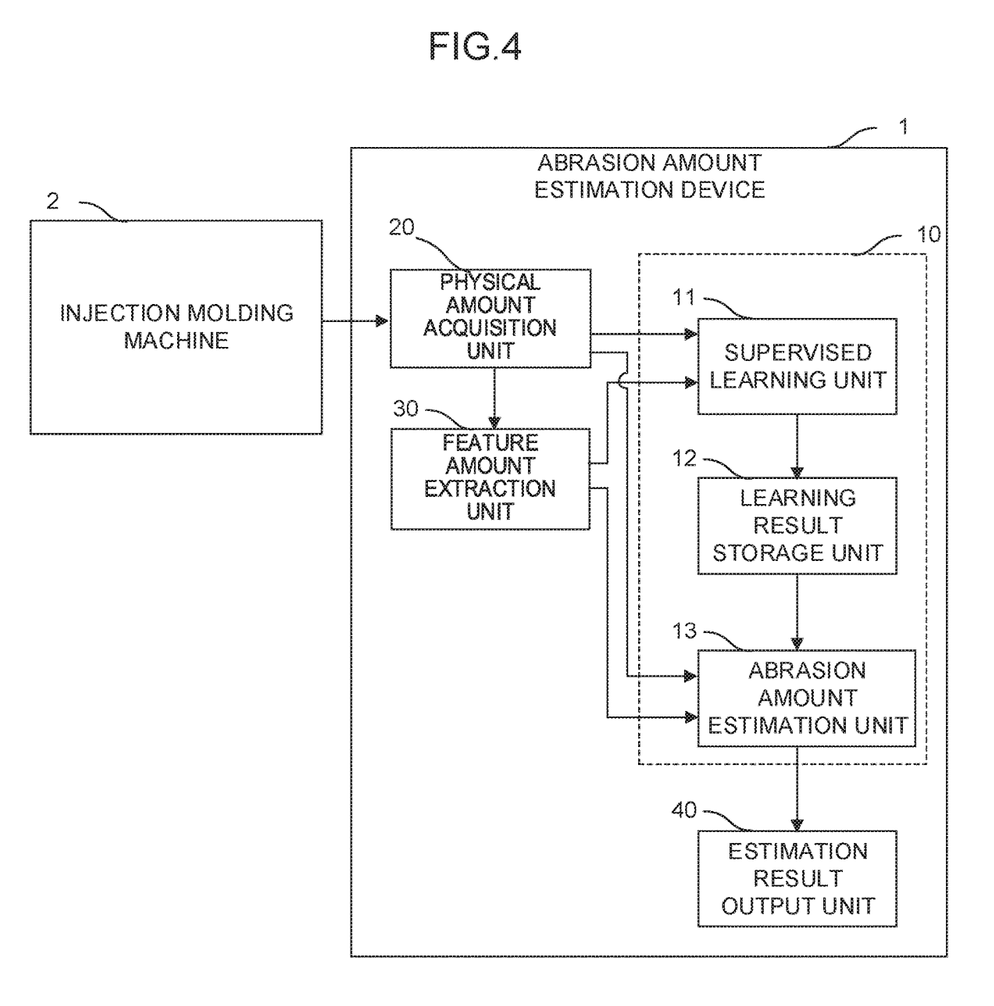
FIG. 4 is a block diagram schematically illustrating the configuration of an abrasion amount estimation device according to an embodiment of the present invention.

FIG. 4 is a block diagram schematically illustrating the configuration of an abrasion amount estimation device for check valve of an injection molding machine according to an embodiment of the present invention.

The abrasion amount estimation device may be implemented as a device of a computer or the like which is connected with an injection molding machine 2 via a communication channel, a signal line, or the like or may be configured on a controller which controls an injection molding device.

An abrasion amount estimation device 1 according to the present embodiment includes a supervised machine learning device 10 (a frame drawn by a dotted line in FIG. 4). To the abrasion amount estimation device 1, a molding condition during injection and waveform data in which a physical amount during injection is associated with elapsed time from the start of the injection or a screw position during the injection are transmitted from the injection molding machine 2.

A physical amount acquisition unit 20 included in the abrasion amount estimation device 1 acquires a molding condition set for the injection molding machine 2 and waveform data in which a physical amount during injection, which is detected by a sensor or the like provided to the injection molding machine 2, is associated with elapsed time from the start of the injection or a screw position during the injection, in the abrasion amount estimation device 1. Examples of the molding condition set for the injection molding machine 2 include at least one or more parameters such as a screw speed and a heater temperature of an injection cylinder, and the molding condition may be composed of a set of a plurality of parameters. Examples of the physical amount during injection include measured data such as an injection speed, a resin pressure, and a load torque in a screw rotation direction, and a feature may be extracted for each set of a plurality of physical amounts.

Here, in the case where the supervised machine learning device 10 is operating in the learning stage, the physical amount acquisition unit 20 may acquire an abrasion amount of a check valve currently attached to the injection molding machine 2. In this case, the configuration may be employed in which an abrasion amount of a check valve currently attached to the injection molding machine 2 can be set with respect to the injection molding machine 2 by an operator and the physical amount acquisition unit 20 acquires the set abrasion amount of the check valve, or the configuration may be employed in which an abrasion amount of the check valve can be set in a memory, which can be read by the abrasion amount estimation device 1, by an operator with an input device which is not illustrated.

A feature amount extraction unit 30 extracts a feature amount from waveform data which is related to injection molding and is acquired by the physical amount acquisition unit 20. A feature amount extracted from waveform data by the feature amount extraction unit 30 may be quantified by using a conventional statistical method, such as the maximum value, the minimum value, an average value, and a dispersion value of waveform data, and a value of a physical amount at timing on which an inclination of waveform data changes, and timing (time and a position), or a pattern shape of a variation pattern of a physical amount with respect to elapsed time or a screw position during injection itself may be set as a feature.

Figure 5:
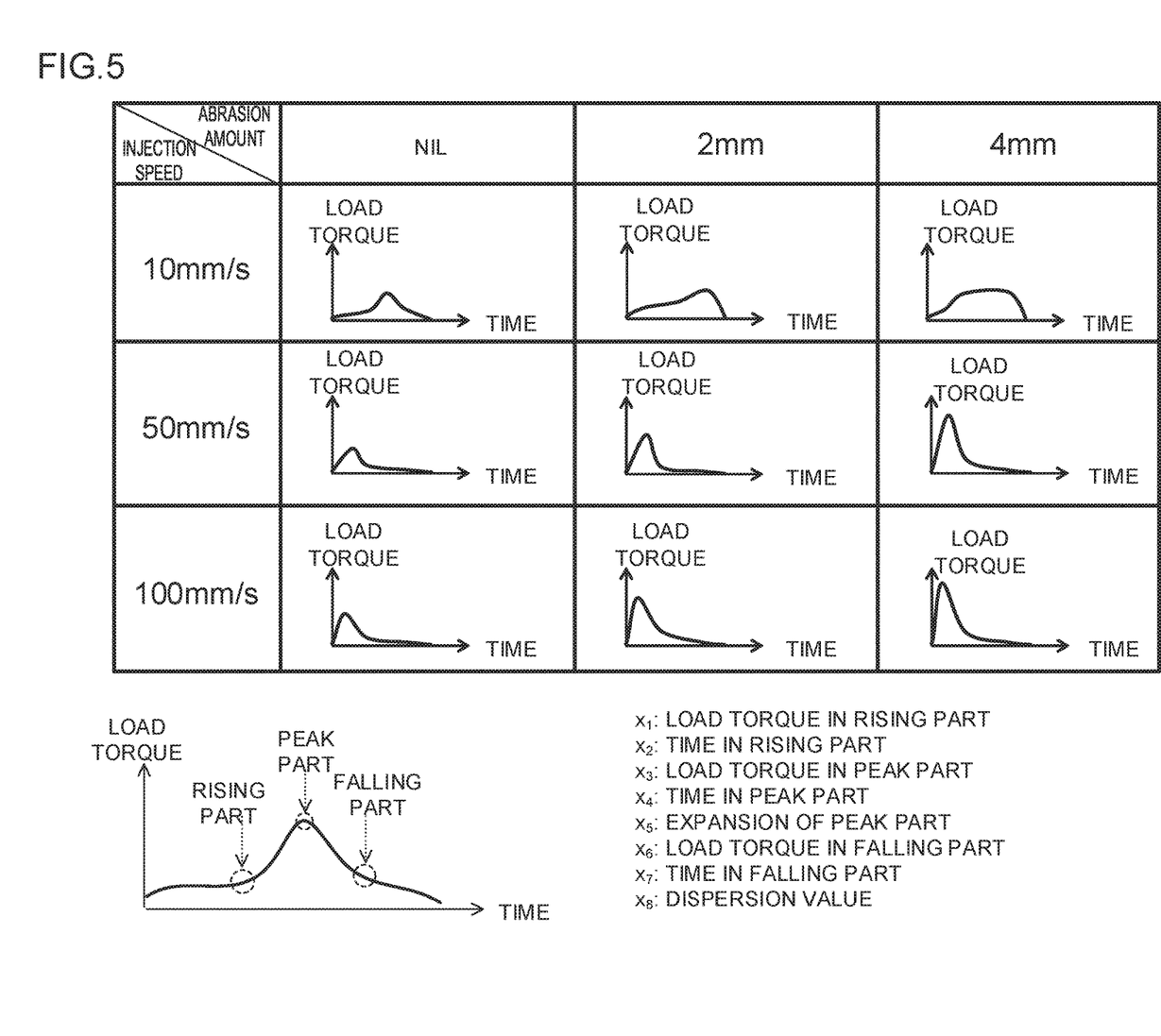
FIG. 5 illustrates a feature amount in the case where waveform data in which a load torque in a screw rotation direction of an injection molding machine is associated with elapsed time from the start of injection is used.

For example, as illustrated in FIG. 5, in the case where waveform data in which a load torque in a screw rotation direction of an injection molding machine is associated with elapsed time from the start of injection is used, a rising part on which rise of a load torque exhibits an inclination equal to or more than a certain degree of inclination (a part on which rapid rise of a load torque starts), a peak part on which a load torque takes the maximum value, and a falling part in which fall of a load torque exhibits an inclination equal to or more than a certain degree of inclination (a part in which fall of a load torque becomes gentle) may be considered as features. In this state, a load torque in the rising part, time in the rising part, a load torque in the peak part, time in the peak part, expansion of the peak part (a time interval representing an interval from a load torque in the peak part to a load torque in a predetermined value α), a load torque in the falling part, time in the falling part, a dispersion value of a load torque, and the like may be extracted as feature amounts.

Figure 6:
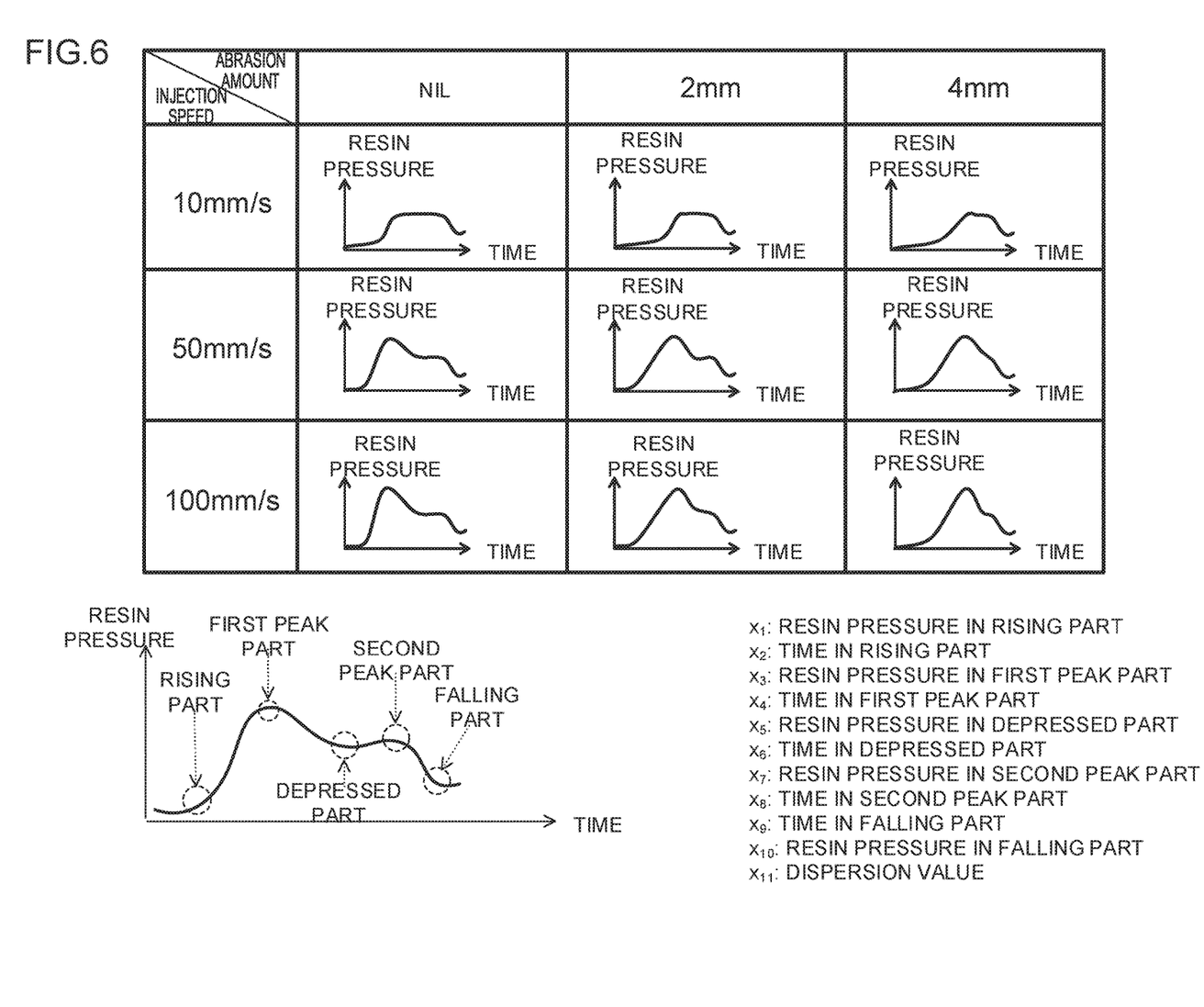
FIG. 6 illustrates a feature amount in the case where waveform data in which resin pressure of an injection molding machine is associated with elapsed time from the start of injection is used.

Further, as illustrated in FIG. 6, for example, in the case where waveform data in which a resin pressure of an injection molding machine is associated with elapsed time from the start of injection is used, a rising part in which rise of resin pressure exhibits an inclination equal to or more than a certain degree of inclination (a part in which rapid rise of resin pressure starts), a first peak part in which a resin pressure first takes the maximum value, a depressed part on which resin pressure has the minimum value after the first peak part, a second peak part in which resin pressure takes the maximum value after the depressed part, and a falling part on which fall of resin pressure exhibits an inclination equal to or more than a certain degree of inclination (a part on which fall of resin pressure becomes gentle) may be considered as features. In this state, resin pressure in the rising part, time in the rising part, resin pressure in the first peak part, time in the first peak part, resin pressure in the depressed part, time in the depressed part, resin pressure in the second peak part, time in the second peak part, resin pressure in the falling part, time in the falling part, a dispersion value of resin pressure, and the like may be extracted as feature amounts.

Here, the above-mentioned physical amounts and feature amounts are just examples and any values may be used as feature amounts as long as the values can express features of a shape of waveform data.

A supervised learning unit 11, a learning result storage unit 12, and an abrasion amount estimation unit 13, which are included in the supervised machine learning device 10, are functional means constituting a chief part of the supervised machine learning device 10.

In case where the supervised machine learning device 10 is set in the learning stage, the supervised learning unit 11 performs supervised learning based on an abrasion amount of a check valve which is acquired by the physical amount acquisition unit 20, a molding condition which is set in the injection molding machine 2, and a feature amount which is extracted by the feature amount extraction unit 30 and stores a learning result in the learning result storage unit 12. The supervised learning unit 11 of the present embodiment proceeds supervised learning by using teacher data in which a molding condition which is acquired by the physical amount acquisition unit 20 and is set in the injection molding machine 2 and a feature amount which is extracted by the feature amount extraction unit 30 are used as input data and an abrasion amount of a check valve is used as output data.

In the supervised learning performed by the supervised learning unit 11 according to the present invention, the correct answer information y mapped from the input x with the function f for performing mapping may be set as a specific numerical value representing an abrasion amount of a check valve or set as information in which abrasion amounts of check valves are classified in stages (a check valve with no abrasion amount, a check valve with 1 mm of abrasion amount of an end surface, a check valve with 2 mm of abrasion amount of an end surface, . . . ).

In the case where the correct answer information y is set as a specific numerical value representing an abrasion amount of a check valve, the regression type supervised learning method may be employed. In this case, a regression formula for mapping the input x (feature amount) to the correct answer information y (a specific numerical value representing an abrasion amount of a check valve) may be obtained as the function f.

Meanwhile, in the case where the correct answer information y is set as information in which abrasion amounts of check valves are classified in stages, the identification type supervised learning method may be employed. In this case, a nonlinear identification surface for identifying the correct answer information y based on the input x may be generated by using a neural network and the nonlinear identification surface thus generated may be set as the function f.

The learning result storage unit 12 is a functional means which stores a result of a learning which has been performed by the supervised learning unit 11 according to teacher data. In the case where the above-mentioned regression formula is used as an estimation model, for example, the learning result storage unit 12 stores a regression formula obtained as a learning result, whereas, in the case where the above-mentioned learning method using a neural network as an estimation model is used, the learning result storage unit 12 stores a parameter of the neural network obtained as a learning result. The learning result storage unit 12 outputs a stored learning result in response to a request from the outside. Through this function, a learning result stored in the learning result storage unit 12 can be transferred to another abrasion amount estimation device or the like to be used, as well.

The abrasion amount estimation unit 13 estimates an abrasion amount of a check valve of the injection molding machine 2 by using a molding condition at the time of injection acquired by the physical amount acquisition unit 20 and a feature amount extracted by the feature amount extraction unit 30, based on a learning result stored in the learning result storage unit 12 when the supervised machine learning device 10 is in the estimation stage.

Further, an estimation result output unit 40 outputs an abrasion amount of a check valve of the injection molding machine 2 estimated by the abrasion amount estimation unit 13 to a display device or the like which is not illustrated. In the case where the abrasion amount estimated by the abrasion amount estimation unit 13 exceeds a predetermined value and the estimation result output unit 40 determines that the abrasion affects molding quality and molding stability, the estimation result output unit 40 may emit a warning accordingly. So, an operator can perform an operation for replacing a current check valve with a new one according to the content of the warning.

The embodiments of the present invention have been described thus far. However, it should be noted that the present invention is not limited to the above-described examples of the embodiments and may be embodied in various aspects by making appropriate alterations or modifications.

For example, the example in which a molding condition is used for learning and estimation of an abrasion amount is described in the above-described embodiment. However, a molding condition is not requisite for learning and estimation of an abrasion amount. In the case where the function f can be obtained only based on an abrasion amount of a check valve and a feature amount extracted from waveform data of a physical amount by the feature amount extraction unit, a molding condition may be omitted.

Further, the method is described in which a feature amount is extracted from waveform data of a physical amount so as to perform learning of the supervised learning device and estimation of an abrasion amount by using the extracted feature amount in the above-described embodiment. However, a method in which a variation pattern of waveform data of a physical amount itself is set as a feature in addition to the above feature amount may be employed. In this case, time variation of a physical amount during injection or variation of a physical amount with respect to a screw position may be applied to an approximate curve, an obtained coefficient of the approximate curve may be set as a feature amount, and learning of the supervised learning device and estimation of an abrasion amount may be performed by using this feature amount.

Furthermore, in the above-described embodiment, the abrasion amount estimation device 1 includes the supervised learning unit 11. However, in the case where it is assumed that a learning result obtained through learning by another abrasion amount estimation device 1 is copied on the learning result storage unit 12 to be used, for example, the supervised learning unit 11 does not have to be implemented.

In the case of the configuration described above, it is possible to estimate an abrasion amount of a check valve adequately by using existing learning results without incorporating a learning mechanism in the case where the same type of injection molding machine or the same type of check valve is used, although it is impossible to learn features of a new injection molding machine or a new check valve.

The invention claimed is:

1. An abrasion amount estimation device which estimates an abrasion amount of a check valve attached to an injection molding machine, the abrasion amount estimation device comprising:
   a learning result storage unit which is configured to store a learning result obtained through supervised learning performed based on a feature amount, the feature amount being extracted from a physical amount in a check valve in which a predetermined abrasion amount is prepared in advance and which is acquired in injection performed by the injection molding machine, and information related to an abrasion amount of a check valve which has been attached to the injection molding machine in the injection;

a physical amount acquisition unit which acquires a physical amount in injection of the injection molding machine;

a feature amount extraction unit which extracts a feature amount of a physical amount based on the physical amount acquired by the physical amount acquisition unit;

an abrasion amount estimation unit which estimates an abrasion amount of a check valve which has been attached to the injection molding machine in the injection, based on the learning result stored in the learning result storage unit and the feature amount extracted by the feature amount extraction unit; and an estimation result output unit which outputs an abrasion amount estimated by the abrasion amount estimation unit.

2. The abrasion amount estimation device according to claim 1, further comprising:

a supervised learning unit which performs supervised learning based on a feature amount, the feature amount being extracted from a physical amount which is acquired in injection performed by the injection molding machine, and information related to an abrasion amount of a check valve which has been attached to the injection molding machine in the injection and stores a result of the learning in the learning result storage unit.

3. The abrasion amount estimation device according to claim 1, wherein a feature amount of the physical amount is a numerical value representing a feature of the physical amount.

4. The abrasion amount estimation device according to claim 1, wherein a feature amount of the physical amount is a feature amount obtained by approximating a variation pattern of the physical amount.

5. An abrasion amount estimation method for check valve attached to an injection molding machine, the abrasion amount estimation method comprising:

performing an injection operation in a state in which a plurality of check valves having abrasion amounts different from each other are attached respectively;

acquiring a physical amount related to an injection operation during the injection operation performed by the injection molding machine;

extracting a feature amount of the physical amount which is acquired;

performing supervised learning in which an abrasion amount of the check valve is used as correct answer information and the feature amount which is extracted is used as an input; and estimating an abrasion amount of a check valve based on a learning result of the supervised learning when an arbitrary feature amount of the physical amount is inputted.

6. The abrasion amount estimation method for check valve according to claim 5, wherein a feature amount of the physical amount is a numerical value representing a feature of the physical amount.

7. The abrasion amount estimation method for check valve according to claim 5, wherein a feature of the physical amount is a feature amount obtained by approximating a variation pattern of the physical amount.

* * * * *